United States Patent [19]

Young et al.

[11] Patent Number: 4,876,016
[45] Date of Patent: Oct. 24, 1989

[54] METHOD OF CONTROLLING THE SEPARATION EFFICIENCY OF A HYDROCYCLONE

[75] Inventors: Grant A. Young, Tulsa; William D. Wakley, Broken Arrow; Steven L. Andrews, Tulsa, all of Okla.

[73] Assignee: Amoco Corporation, Chicago, Ill.

[21] Appl. No.: 211,539

[22] Filed: Jun. 27, 1988

[51] Int. Cl.$^4$ .................. C02F 1/38; B01D 17/038; B04C 5/18; B04C 11/00
[52] U.S. Cl. .................. 210/739; 210/745; 210/787; 210/96.1; 210/221.2; 210/512.1
[58] Field of Search ............... 210/739, 740, 745, 787, 210/788, 96.1, 218, 221.2, 512.1, 96.2; 209/164, 168, 211

[56] References Cited

U.S. PATENT DOCUMENTS

| 3,489,680 | 1/1970 | Snavely, Jr. | 210/512.1 |
| 3,966,603 | 6/1976 | Grant | 210/745 |
| 4,399,027 | 8/1983 | Miller | 209/164 |
| 4,587,024 | 5/1986 | Hayatdavoudi | 210/739 |
| 4,622,150 | 11/1986 | Carroll | 210/739 |

FOREIGN PATENT DOCUMENTS 8500851  2/1985  World Int. Prop. O. .......... 210/788

Primary Examiner—Ricahrd V. Fisher
Assistant Examiner—Linda Evans
Attorney, Agent, or Firm—Scott H. Brown; Fred E. Hook

[57] ABSTRACT

A method and related apparatus are disclosed herein for controlling the quantity of oil as a contaminant being discharged with water from a hydrocyclone. The hydrocyclone comprises a conical body with an upper liquid mixture inlet, a drive fluid inlet, an overflow outlet for the separated oil and drive fluid, and an underflow outlet for the separated water. The method includes monitoring the quantity of separated oil with the discharged water and varying the quantity of the drive fluid introduced into the interior of the hydrocyclone whereby the quantity of the oil as a contaminant is minimized.

9 Claims, 1 Drawing Sheet

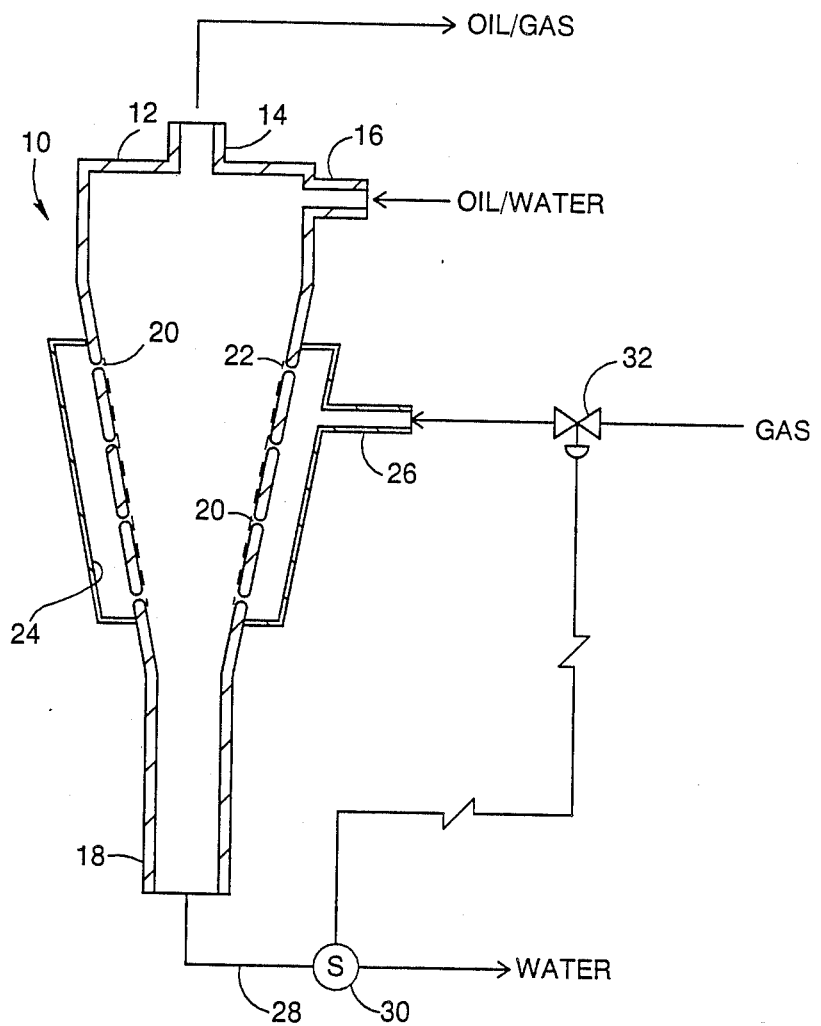

METHOD OF CONTROLLING THE SEPARATION EFFICIENCY OF A HYDROCYCLONE

BACKGROUND OF THE INVENTION

1. Field of the Invention

The present invention relates to the separation of different density liquid components from the liquid mixture within a hydrocyclone and, more particularly, to a method and related apparatus for controlling the separation efficiency of a hydrocyclone.

2. Setting of the Invention

The utilization of hydrocyclones to separate the liquid components of a liquid mixture in relation to their densities is well known to those skilled in the art. Such hydrocyclones have been utilized in the oil production industry to separate water produced from the crude oil, because the crude oil must be essentially free of water before it can be sold or transported within pipelines. Also, the produced waste water is discharged into streams, holding ponds or into the ocean from an offshore platform. This waste water can include only a very minimal amount of oil because of environmental concerns.

To be able to remove the oil from the water is extremely difficult because the density difference between these two components is small. Typical oil/water separation hydrocyclones have a very small (such as about 1 MM) opening for the oil rich slurry to flow out to reduce the amount of water discharged with the oil. However, in the production of crude oil, it has been found that these small diameter openings may become clogged, whereupon no oil is separated and oil is discharged with the water. There is a need for an efficient oil and water separator that can be provided with mechanisms for minimizing the clogging of the small oil outlets.

Various types of hydrocyclones have been developed which include gas or liquid injection. Examples are disclosed in U.S. Pat. Nos. 3,489,680 and 4,399,027. Within these hydrocyclones, a gas or a liquid is introduced into plenum wherefrom the gas or liquid is introduced into the interior of the hydrocyclone to aid in the separation or "flotation" of the lighter density components. Nowhere is there disclosed or suggested within these patents of a system or a method of controlling the quantity of air or liquid being introduced in relation to the amount of oil found within the feed stream to minimize the discharge of water with oil when there is not much oil present and to maximize oil removal when large amounts of oil are fed to the device. At the same time, this continuous flow of air increases the necessary oil discharge diameter.

Various systems have been developed for determining the quantity of oil that is discharged with the produced water and then varying the backpressure within a hydrocyclone to minimize the quantity of oil. One such system is disclosed in U.S. Pat. No. 4,622,150 wherein an oil-in-water sensor is provided on the underflow of a hydrocyclone. A control signal from the sensor causes a valve on the overflow of the hydrocyclone to regulate the backflow within the hydrocyclone and thus control the quantity of oil that is discharged with the water. There is no disclosure or suggestion within U.S. Pat. No. 4,622,150 of varying a quantity of gas or liquid introduced into a sparged hydrocyclone, or of not restricting the overflow to control the quantity of oil discharged with water.

SUMMARY OF THE INVENTION

The present invention has been developed to overcome the foregoing deficiencies and to meet the above described needs. Specifically, the present invention is a method and related apparatus for controlling the separation efficiency of a hydrocyclone. The hydrocyclone includes an essentially conical separating chamber or body with an upper liquid mixture inlet, a drive fluid inlet below the liquid mixture inlet, and an overflow outlet for removal of a first separated liquid (such as oil) and the drive fluid. An underflow outlet is provided for the removal of a second separated liquid, such as water. The quantity of the first separated liquid with the second separated liquid being discharged from the underflow outlet is monitored, such as by an oil-in-water sensor. From the sensor's reading, the quantity of the drive fluid introduced into the conical separation chamber is varied. For example, an increase in the quantity of oil being discharged with water is monitored and then the quantity of drive fluid, such as gas, introduced into the hydrocyclone is decreased. The reduction in the quantity of gas permits more oil to be removed through the overflow outlet. By way of the present invention, the benefits of a fluid sparged hydrocyclone system can be combined with the nonclogging abilities of a larger opening within the oveflow of a hydrocyclone to control the quantity of oil being discharged with water.

BRIEF DESCRIPTION OF THE DRAWING

The FIGURE is a semidiagramatic cross-sectional view of a fluid sparged hydrocyclone system embodiying the present invention.

DETAILED DESCRIPTION OF PREFERRED EMBODIMENTS

As shown in the FIGURE, the present invention generally comprises a gas sparged hydrocyclone system with an elongated essentially conical separation body or chamber 10 that can be of any desired configuration, as is well known to those skilled in the art. The chamber 10 includes a closed top portion 12 with an overflow outlet 14 in the form of a simple opening or in the form of a vortex-finding tube extending partially into the interior of the upper portion of the chamber 10. For reasons that will be described later, the diameter of the opening 14 can be larger than usual to prevent clogging. At least one tangential liquid mixture inlet 16 is connected to an upper portion of the chamber 10, and a lower portion of the chamber 10 is provided with a central underflow opening 18.

In the construction and operation of the present invention, the liquid mixture introduced into the interior of the hydrocyclone can be introduced at a constant flow rate and flow pressure, such as by using a positive displacement pump or a centrifugal type pump.

The chamber 10 is provided with a mechanism for introducing a drive fluid into the interior of the chamber 10. The walls of the chamber 10 are provided with a plurality of holes 20 to permit the drive fluid to pass through the chamber 10 and through a fluid permeable lining, screen or filter 22. A plenum 24 surrounds the exterior of the chamber 10 adjacent the openings 20 and is provided with a drive fluid inlet conduit 26 for supplying the secondary fluid through the plenum 24, the openings 20, the lining 22 and into the interior of the chamber 10. It should be understood that the openings 20 can be radially directed, tangentially directed, or directed in any other manner desired.

The operation of the above described embodiment of the hydrocyclone is essentially the same as prior fluid sparged hydrocyclones. A drive fluid, such as a demulsifier, or a gas, such as air, nitrogen, hydrogen, inert gas or the like, is introduced through the conduit 26 into the plenum 24, and then through the openings 20 and the lining 22 into the interior of the chamber 10. A liquid mixture, such as oil and water, is introduced through the conduit 16 into the interior of the chamber 10 and therein is caused to rotate. The vortex formed within the chamber 10 causes the lighter density fraction, such as oil, to move to the center of the chamber 10 and the higher density fraction, such as water, to move to the outer periphery of the interior of the chamber 10. The introduced drive fluid, such as air, bubbles up through the liquids helping in the separation of the oil from the water. The drive fluid must compete with the oil in exiting through the overflow opening 14. It has been found that this type of system is self-cleaning and that foreign material is blown past the overflow opening 14 without clogging. Normally an increased diameter of the overflow opening 14 would increase the amount of water which would escape through the overflow opening 14 with the separated oil. However, even though a larger opening is used, the separation efficiency can be maintained and the amount of water which must exit the overflow opening 14 with the oil is reduced. Specifically, introduced air will bubble up and out of the overflow opening 14 carrying the oil to exit and limiting the amount of water which may escape through this opening.

To regulate the quantity of drive fluid introduced, an underflow conduit 28 includes an oil-in-water sensor 30, which measures the quantity of oil in the water that is about to be discharged. The sensor 30 provides an operating control signal to a regulator means such as a valve 32 on the conduit 26 that provides the drive fluid to the interior of the chamber 10. By regulating the constriction position of the valve 32, the quantity of oil being discharged through the conduit 28 can be regulated. For example, if the sensor 30 indicates a level of oil contaminant in the water that is above a prescribed limit, then the quantity of gas being introduced through the conduit 26 is *decreased* by adjusting the constriction position of the valve 32. The reduced amount of gas being introduced through the conduit 26 into the interior of chamber 10 permits a greater quantity of fluid which is oil rich to be discharged through the opening 14 than had been previously permitted, thereby decreasing the quantity of oil being caused to be discharged through the opening 18 and out the conduit 28.

The quantity of drive fluid being introduced into the conduit 26 is determined by varying the constriction position of the valve 32, but also can include varying the speed of the compressor or pump providing the drive fluid through the conduit 26. As previously stated, the lining 22 is mounted to the interior surface of the chamber 10 and is formed from a material that provides a structure for permitting the flow of the secondary fluid into the chamber 10. Microscopically porous materials can be utilized if an auxiliary fluid is a liquid, such as a light mineral oil, distilled water or other liquid of choice, as well as a gas. The lining 22 may be screen material with holes on the order of about 1 to about 100 MM, or can include porous silica, cellulose liners, synthetic resin liners formed from different polymers, diatomaceous earth, fiberglass, steel wool and other mineral waste materials coated with binding resins. Preferably, screens formed from plastic, ceramic or metallic material are used with hole size ranges of about 1 to about 100 MM and about 100 to about 10,000 holes per square inch.

Wherein the present invention has been described in particular relation to the drawing attached hereto, it should be understood that other and further modifications, apart from those shown or suggested herein, may be made within the scope and spirit of the present invention.

What is claimed is:

1. A method of controlling the quantity of a first liquid being discharged with a denser second liquid from a hydrocyclone, the hydrocyclone including a conical body with an upper liquid mixture inlet, a drive fluid inlet spaced below the liquid mixture inlet, an upper overflow outlet for discharge of the first liquid in the drive fluid, and a lower underflow outlet for discharge of the second liquid, the method comprising:
    (a) monitoring the quantity of the first liquid being discharged with the second liquid from the lower underflow outlet; and
    (b) if the monitored quantity of the first liquid being discharged with the second liquid is outside prescribed limits, then varying the quantity of the drive fluid introduced into the conical body to minimize the quantity of the first liquid being discharged with the second liquid from the lower underflow outlet.

2. The method of claim 1 wherein the first liquid is oil, the second liquid is water and the drive fluid is a gas.

3. The method of claim 1 wherein step (b) comprises operating a valve to effect variable restriction of flow of the drive fluid into the conical body.

4. A hydrocyclone liquid separator system, comprising:
    an elongated conical separating body having a first end and a second end,
    at least one liquid mixture inlet adjacent the first end,
    means for introducing a drive fluid into the separating body between the first end and the second end,
    an outlet adjacent the first end for discharge of a first separated liquid and the drive fluid, and an outlet adjacent the second end for discharge of a denser second separated liquid;
    monitoring means for monitoring the quantity of the first separated liquid being discharged with the second separated liquid from the outlet adjacent the second end; and
    regulator means for minimizing the quantity of the first separated liquid being discharged with the second separated liquid from the outlet adjacent the second end by varying the quantity of drive fluid introduced into the separating body in response to the monitoring means.

5. A hydrocyclone liquid separator system of claim 4 wherein the at least one liquid mixture inlet is tangential to the separating body.

6. A hydrocyclone liquid separator system of claim 4 wherein the means for introducing the drive fluid comprises means defining a plurality of openings through a wall of the separating body, a plenum sealably surrounding the exterior of the openings, and a drive fluid conduit for providing the drive fluid into the interior of the plenum.

7. A hydrocyclone liquid separator system of claim 4 wherein the means for introducing the drive fluid comprises a fluid permeable lining within at least a portion of the interior of the separating body, a plenum sealably surrounding the exterior of the separating body adjacent the fluid permeable lining, and a drive fluid conduit for providing the drive fluid into the interior of the plenum.

8. A hydrocyclone liquid separator system of claim 7 wherein the fluid permeable lining is a gas permeable screen.

9. A hydrocyclone liquid separator of claim 4 wherein the regulator means comprises a sensor connected to a conduit extending from the second separated liquid outlet for determining the quantity of the first separated liquid within the second separated liquid, and valve means in operative communication with the sensor for varying the quantity of the drive fluid introduced into the separating body.

* * * * *